US010721619B2

(12) United States Patent
Miklós et al.

(10) Patent No.: US 10,721,619 B2
(45) Date of Patent: Jul. 21, 2020

(54) METHODS AND NETWORK NODES FOR MANAGING WIRELESS DEVICE ASSOCIATED INFORMATION IN A WIRELESS COMMUNICATION NETWORK

(71) Applicant: Telefonaktiebolaget LM Ericsson (publ), Stockholm (SE)

(72) Inventors: György Miklós, Pilisborosjenö (HU); Karl Norrman, Stockholm (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 487 days.

(21) Appl. No.: 15/308,705

(22) PCT Filed: May 13, 2015

(86) PCT No.: PCT/SE2015/050545
§ 371 (c)(1),
(2) Date: Nov. 3, 2016

(87) PCT Pub. No.: WO2015/174917
PCT Pub. Date: Nov. 19, 2015

(65) Prior Publication Data
US 2017/0195875 A1 Jul. 6, 2017

Related U.S. Application Data
(60) Provisional application No. 61/992,737, filed on May 13, 2014.

(51) Int. Cl.
*H04W 12/02* (2009.01)
*H04L 29/06* (2006.01)
(Continued)

(52) U.S. Cl.
CPC ............... *H04W 12/02* (2013.01); *H04L 9/00* (2013.01); *H04L 9/08* (2013.01); *H04L 63/0428* (2013.01);
(Continued)

(58) Field of Classification Search
CPC ........... H04W 12/02; H04W 12/04071; H04W 12/0403; H04W 12/0401; H04W 28/0289;
(Continued)

(56) References Cited

U.S. PATENT DOCUMENTS 8,705,743 B2 * 4/2014 Howard ............... H04L 63/0428
380/277
2007/0297367 A1  12/2007 Wang et al.
2014/0122885 A1   5/2014 Wu et al.

FOREIGN PATENT DOCUMENTS

EP      2479921 A1    7/2012
WO   2012097883 A1    7/2012
(Continued)

OTHER PUBLICATIONS

Alcatel-Lucent, et al., "S3-140893: Draft LS Reply to LS on Providing the IMEISV to eNB," 3rd Generation Partnership Project (3GPP), TSG SA WG3 (Security) Meeting #75, May 12-16, 2014, 2 pages, Sapporo, Japan.
(Continued)

*Primary Examiner* — Paul E Callahan
(74) *Attorney, Agent, or Firm* — Sage Patent Group

(57) ABSTRACT

It is provided a core network node, e.g. MME, and a first network node, e.g. a OAM congestion reporting function node, for managing wireless device associated information, in particular for or as part of congestion handling. The nodes are comprised in a wireless communication network, such as a telecommunications network. The core network node obtains the wireless device associated information, encrypts
(Continued)

it into an encrypted representation, and sends data comprising the encrypted representation to an OAM system via a RAN. The first network node receives, from the OAM system, the encrypted representation of the wireless device associated information, and decrypts it using one or more decryption keys accessible by the first network node.

8 Claims, 8 Drawing Sheets

(51) Int. Cl.

| | | |
|---|---|---|
| *H04W 28/02* | (2009.01) | |
| *H04W 36/00* | (2009.01) | |
| *H04L 9/00* | (2006.01) | |
| *H04W 28/12* | (2009.01) | |
| *H04W 12/00* | (2009.01) | |
| *H04L 9/08* | (2006.01) | |
| *H04W 12/04* | (2009.01) | |
| *H04W 48/16* | (2009.01) | |
| *H04W 8/20* | (2009.01) | |

(52) U.S. Cl.
CPC ....... *H04W 12/0017* (2019.01); *H04W 12/04* (2013.01); *H04W 28/0289* (2013.01); *H04W 28/12* (2013.01); *H04W 36/0033* (2013.01); *H04W 48/16* (2013.01); *H04L 2209/80* (2013.01); *H04W 8/20* (2013.01)

(58) Field of Classification Search
CPC ... H04W 36/0038; H04L 9/08; H04L 2209/80
See application file for complete search history.

(56) References Cited

FOREIGN PATENT DOCUMENTS

| WO | 2013123467 A1 | 8/2013 |
|---|---|---|
| WO | 2014065898 A1 | 5/2014 |

OTHER PUBLICATIONS

Author Unknown, "Technical Specification Group Services and System Aspects; Study on system enhancements for user plane congestion management (Release 13)," Technical Report 23.705, Version 0.10.0, 3GPP Organizational Partners, Apr. 2014, 64 pages.
Author Unknown, "Technical Specification Group Services and System Aspects; General Packet Radio Service (GPRS) enhancements for Evolved Universal Terrestrial Radio Access Network (E-UTRAN) access (Release 12)," Technical Specification 23.401, Version 12.4.0, 3GPP Organizational Partners, Mar. 2014, 302 pages.
Author Unknown, "Technical Specification Group Services and System Aspects; Telecommunication management; Subscriber and equipment trace; Trace control and configuration management (Release 12)," Technical Specification 32.422, Version 12.4.0, 3GPP Organizational Partners, Dec. 2014, 140 pages.
China Telecom, et al., "S2-131610: RPPF based Solution for Operator Controlled Off-path Congestion Awareness and Notification," 3rd Generation Partnership Project (3GPP), SA WG2 Meeting #S2-97, May 27-31, 2013, 10 pages, Busan, South Korea.
NSN, "S3-140882: Draft Reply to LS on Providing the IMEISV to eNB," 3rd Generation Partnership Project (3GPP), TSG SA WG3 (Security) Meeting #75, May 12-16, 2014, 2 pages, Sapporo, Japan.
International Search Report and Written Opinion for International Patent Application No. PCT/SE2015/050545, dated Oct. 22, 2015, 14 pages.
European Search Report for European Patent Application No. 15792878.9, dated Feb. 1, 2017, 5 pages.
European Office Action dated Nov. 27, 2019 for European Patent Application No. 15792878.9, 7 pages.
3GPP TR 23.705 V13.0.0 (Dec. 2014), 3rd Generation Partnership Project; Technical Specification Group Services and System Aspects; Study on system enhancements for user plane congestion management (Release 13), P050835248, Retrieved from the Internet: URL:http://www.3gpp.org/ftp/tsg_sa/WG2_Arch/ Latest_ SA2 _ Specs/Latest_ draft_ S2 _Specs/ [ retrieved on Apr. 3, 2014], pp. 1-61.

* cited by examiner

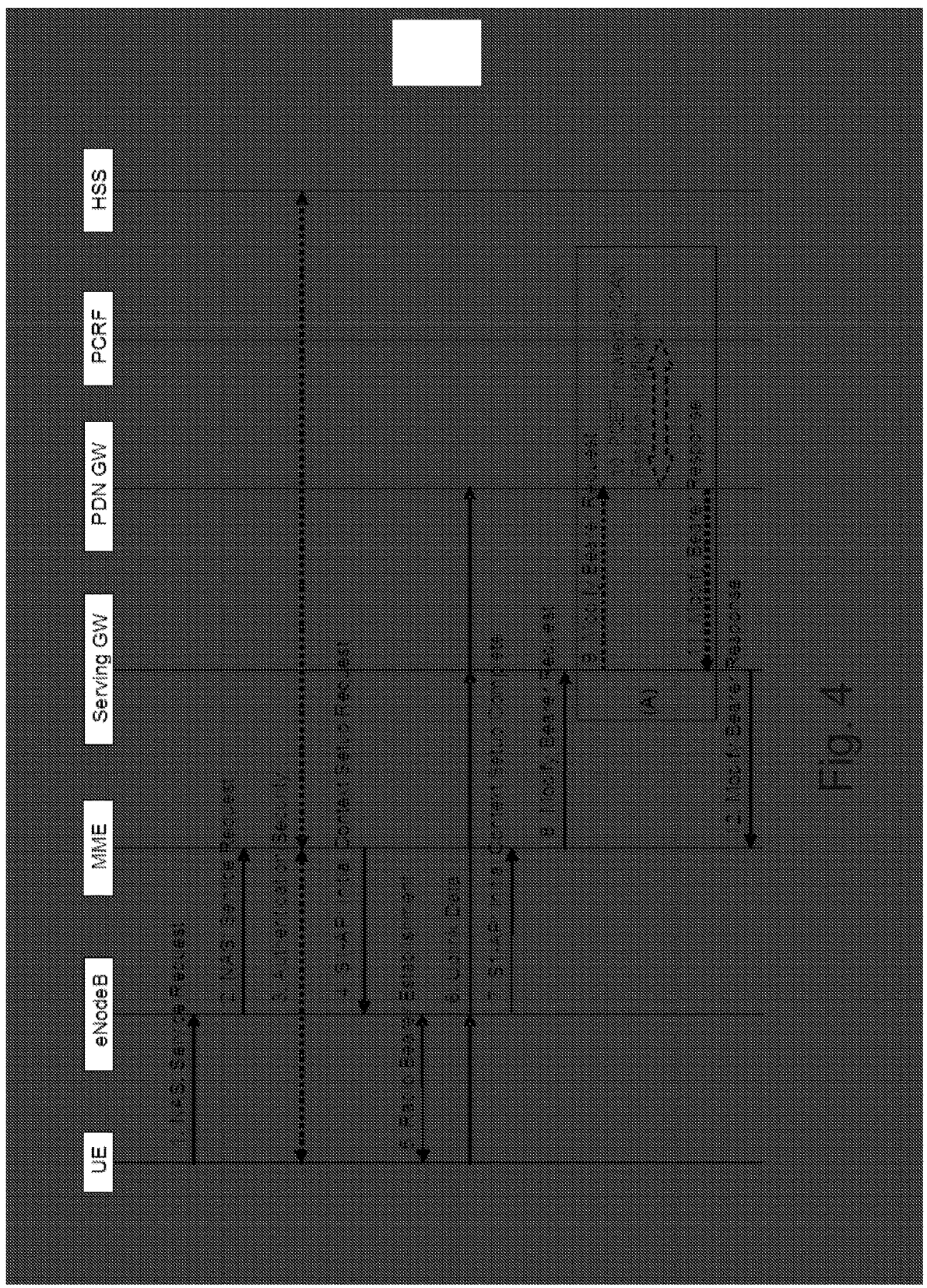

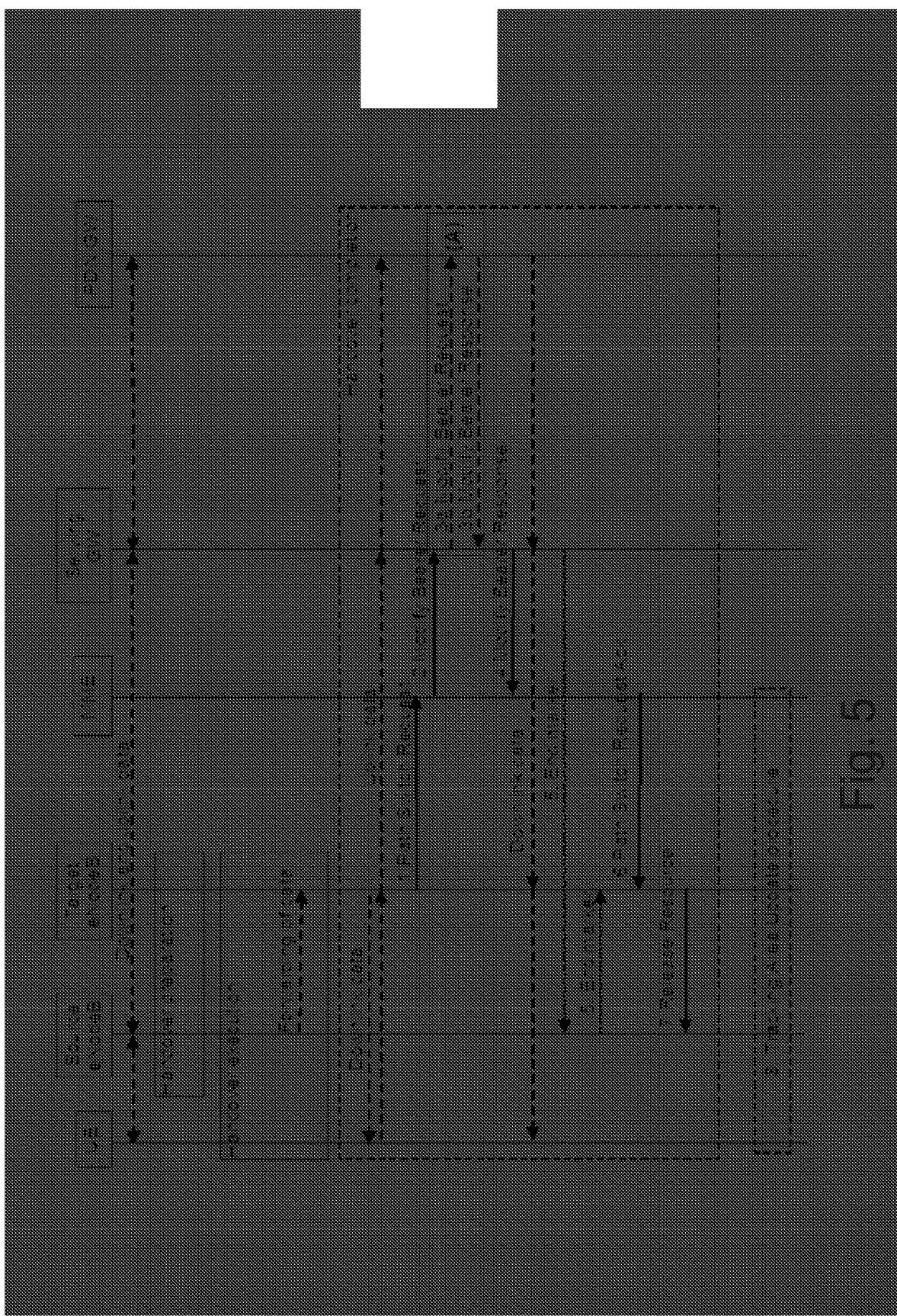

METHODS AND NETWORK NODES FOR MANAGING WIRELESS DEVICE ASSOCIATED INFORMATION IN A WIRELESS COMMUNICATION NETWORK

This application is a 35 U.S.C. § 371 national phase filing of International Application No. PCT/SE2015/050545, filed May 13, 2015, which claims the benefit of U.S. Provisional Application No. 61/992,737, filed May 13, 2014, the disclosures of which are incorporated herein by reference in their entireties.

TECHNICAL FIELD

Embodiments herein relate to methods and network nodes comprised in a wireless communication network, such as a telecommunications network, and to managing wireless device associated information, such as identities of wireless devices in connection with congestion handling.

BACKGROUND

Communication devices such as wireless devices are also known as e.g. User Equipments (UEs), mobile terminals, wireless terminals and mobile stations. Wireless devices are enabled to communicate wirelessly in a cellular communication network, wireless communication network or wireless communications system, sometimes also referred to as a cellular radio system or a cellular network. The communication may be performed, e.g., between two wireless devices, between a wireless device and a regular telephone and/or between a wireless device and a server via a Radio Access Network (RAN), and possibly one or more core networks, comprised within the cellular communication network.

Wireless devices may further be referred to as mobile telephones, cellular telephones, laptops, or tablet computer with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communication network covers a geographical area which is divided into cell areas, each cell area being served by an access node such as a base station (BS), e.g., a Radio Base Station (RBS), which sometimes may be referred to as e.g. "evolved Node B", "eNB", "eNodeB", "NodeB", "B node", "node B" or BTS (Base Transceiver Station), depending on the technology and terminology used. The base stations may be of different classes such as, e.g., macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile). In 3rd Generation Partnership Project (3GPP) Long Term Evolution (LTE), base stations, which may be referred to as eNodeBs, eNBs or even NBs, may be directly connected to other base stations and may be directly connected to one or more core networks.

The 3GPP LTE radio access standard has been written in order to support high bitrates and low latency both for uplink and downlink traffic. All data transmission is in LTE are controlled by the base stations.

UMTS is a third generation mobile communication system, which may be referred to as 3G, and which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Moreover, the 3GPP has undertaken to evolve further the UTRAN and GSM based radio access network technologies, for example into evolved UTRAN (E-UTRAN) used in LTE.

In the context of this disclosure, the expression Downlink (DL) may be used for the transmission path, or send direction, from a base station to a mobile station. The expression Uplink (UL) may be used for the transmission path, or send direction, in the opposite direction, i.e. from a mobile station to a base station.

Packet data traffic is growing very quickly in mobile operator networks, in many cases it grows much more quickly than the rate at which the operator is able to expand network capacity. This leads to more frequent occurrences of congestion in the network, e.g. when the offered traffic is higher than what the RAN is able to fulfill. Also, new services appear often, which may lead to a situation when a new Quality of Experience (QoE) requirement has to be introduced into the network quickly. In this situation, operators need efficient and flexible tools by which they can control how the bottleneck RAN capacity can be best shared so that they can maximize the QoE of their users.

A new type of solution has been put forward in context of a 3GPP User Plane CONgestion management (UPCON) work item, which solution utilizes congestion feedback from the CN to the RAN. This has been documented in 3GPP TR 23.705 version 0.10.0. When RAN indicates congestion to the CN, actions may be taken to mitigate the congestion, such as limiting some classes of traffic, or request to delay some other classes of traffic.

In practice, a wireless communication network, e.g. based on LTE or UMTS, typically comprises an Operation, Administration and Maintenance (OAM) system which may be part of an Operational Support System (OSS). The OAM system comprises functionality and interfaces for an operator of the wireless communication network to operate, administrate, maintain and manage the wireless communication system. A part of the OAM system, which may be referred to as RAN OAM system or simply RAN OAM, is associated with the RAN and responsible for operation, administration, maintenance and/or management of RAN nodes, i.e. nodes comprised in the RAN, or, in other words, radio network nodes. The RAN OAM system typically contains a lot of information based on which an operator may derive when a state of congestion takes place. Such information, which may be referred to as congestion information, may include for example data about the amount of packet loss, packet delay, traffic throughput, air interface utilization, number of connected users, number of connected users with non-empty buffers, etc. A mobile network operator may configure thresholds on one, or on a combination, of these metrics to determine when a state of congestion is considered in its network. It is also possible for a mobile operator to define multiple levels of congestion using the combination of these metrics, so that the congestion mitigation actions can correspond to the current level of congestion.

Current RAN OAM systems work on a per cell or lower granularity. That means that the determination of congestion could be performed on a per cell basis, or for a group of cells, such as cells belonging to the same eNB for LTE, i.e. 4G, or cells belonging to the same Service Area for UMTS, i.e. 3G. In order for the core network to take appropriate mitigation action, the core network also has to find out which UEs are located in a given cell. Hence, the list of affected UEs needs to be determined for the cells which are considered congested based on OAM data.

A solution named 1.5.5 (also called off-path solution) in section 6.1.5.5 of 3GPP TR 23.705 version 0.10.0, suggests a new interface Nq for this purpose. The Nq interface is defined between a new network entity RAN Congestion Awareness Function (RCAF) and the Mobility Management Entity (MME). The RCAF is the node which is assumed to receive RAN congestion related data from the RAN OAM system on a per cell (or lower) spatial granularity. Then, using the Nq interface, the RCAF queries the MME to supply the list of UEs per cell.

A similar approach is suggested for the 3G case, using a Nq' interface from the RCAF to the Serving GPRS Support Node (SGSN). However, there is a suggested difference. For 3G, the RAN may already have the UE identities as the International Mobile Subscriber Identity (IMSI) may be sent to the RNC. It is suggested that the RAN OAM collects these IMSIs and the RAN OAM then supplies the list of UEs, identified by IMSIs, that were affected by congestion to the RCAF. Hence, for 3G it is suggested that the list of UEs affected by congestion are known to the RCAF without contacting the SGSN over the Nq' interface.

Besides the UE identities, it is also helpful to receive the list of Access Point Names (APNs) in the RCAF node. An APN identifies an external network where a UE is connected to. Most commonly this is the Internet, but may e.g. be a corporate intranet, or an operator may have its own network for e.g., IMS or MMS, etc. For example may the Gateway GPRS support node (GGSN) or Packet Data Network Gateway (PGW) be selected based on the APN. In other words, the APN is typically needed to know to which packet data network a congestion mitigation action should apply to. The APN may also be used, or even be needed, to determine a proper Policy and Charging Rules Function (PCRF) which may make congestion mitigation decisions. In LTE, the APN may be determined from the MME using the Nq interface. In 3G the APN may be determined from the SGSN using the Nq' interface.

An alternative solution is named 1.5.4 (also called integrated solution) and is also proposed in 3GPP TR 23.705 version 0.10.0, more particularly in section 6.1.5.4, wherein the RCAF (or RPPF, another terminology applied to the corresponding node) signals the per cell congestion information to the PCRF. The PCRF receives the list of UEs in the given cell using the cell-id sent in uplink user plane data packets from the RAN node up to the PGW, which then forwards the cell-id information to the PCRF so that the list of UEs per cell may be determined.

SUMMARY

An object is to provide one or more improvements with regard to congestion handling in a wireless communication network.

According to a first aspect of embodiments herein, the object is achieved by a method, performed by a core network node, e.g. MME or SGSN, for managing wireless device associated information. The core network node is being comprised in a core network of a wireless communication network. The wireless communication network further comprises a Radio Access Network (RAN) and an Operation and Management (OAM) system. The core network node obtains said wireless device associated information. The core network node then encrypts the wireless device associated information into an encrypted representation. One or more decryption keys for decryption of the encrypted representation is accessible by another, first network node comprised in the wireless communication network. The core network node sends, to the OAM system via the RAN, data comprising the encrypted representation.

According to a second aspect of embodiments herein, the object is achieved by a computer program comprising instructions that when executed by a processing circuit causes the core network node to perform the method according to the first aspect.

According to a third aspect of embodiments herein, the object is achieved by a data carrier comprising the computer program according to the second aspect.

According to a fourth aspect of embodiments herein, the object is achieved by a method, performed by a first network node, e.g. a OAM Congestion Reporting Function (OCRF) node, for managing wireless device associated information. The first network node is comprised in a wireless communication network. The wireless communication network further comprises an OAM system. The first network node receives, from the OAM system, an encrypted representation of the wireless device associated information. The first network node decrypts the encrypted representation using one or more decryption keys accessible by the first network node.

According to a fifth aspect of embodiments herein, the object is achieved by a computer program comprising instructions that when executed by a processing circuit causes the first network node to perform the method according to the fourth aspect.

According to a sixth aspect of embodiments herein, the object is achieved by a data carrier comprising the computer program according to the fifth aspect.

According to a seventh aspect of embodiments herein, the object is achieved by a core network node, e.g. MME or SGSN, for managing wireless device associated information. The core network node is configured to be comprised in a core network of a wireless communication network. Said wireless communication network comprises a RAN and an OAM system. The core network node is configured to obtain said wireless device associated information. Moreover, the core network node is configured to encrypt the wireless device associated information into an encrypted representation, where one or more decryption keys for decryption of the encrypted representation is accessible by another, first network node comprised in the wireless communication network. Further, the core network node is configured to send, to the OAM system via the RAN, data comprising the encrypted representation.

According to an eight aspect of embodiments herein, the object is achieved by a first network node, e.g. OCRF node, for managing wireless device associated information. The first network node is configured to be comprised in a wireless communication network that comprises an OAM system. The first network node is configured to receive, from the OAM system, an encrypted representation of the wireless device associated information. The first network node is further configured to decrypt the encrypted representation using one or more decryption keys accessible by the first network node.

The encryption and decryption in the above context of embodiments herein enable reduction of privacy concerns related to prior art solutions for congestion handling, in particular the RAN need not be exposed to any wireless device associated information in clear text.

Even the risk that e.g. change patterns caused by mobility and or connections to the wireless communication network can be used to derive information about wireless devices may be avoided through the above described handling relating to the encryption seed. Wireless device associated information comprising e.g. an identity of a wireless device will be encrypted before it is sent to the RAN and the encrypted representation thereof may be adjusted using the encryption seed, that may correspond to a freshness-value, which may change for example at user mobility and/or at idle to connected state transition.

Also, specification impact as well as implementation impact is low since it can be shown that it may suffice to introduce a new information element (IE), i.e. sending of some new information, rather than e.g. defining and implementing a new interface as in some prior art solutions.

Moreover, thanks to the embodiments herein, the OAM system may be used as a single source to collect all congestion related data and may initiate mitigation of congestion through the first network node. This corresponds to a simplification and also enables possible performance enhancements. As mentioned, at the same time user privacy is maintained.

BRIEF DESCRIPTION OF THE DRAWINGS

Various aspects of embodiments disclosed herein, including particular features and advantages thereof, will be readily understood from the following detailed description and the accompanying schematic drawings, which are briefly described in the following.

FIG. 4 is a combined signaling diagram and flowchart for describing how the embodiments herein may be used in an LTE based wireless communication network.

FIG. 5 is a combined signaling diagram and flowchart for describing how embodiments herein may be implemented in the context of a commonly used handover procedure in LTE.

DETAILED DESCRIPTION

Figure 1:
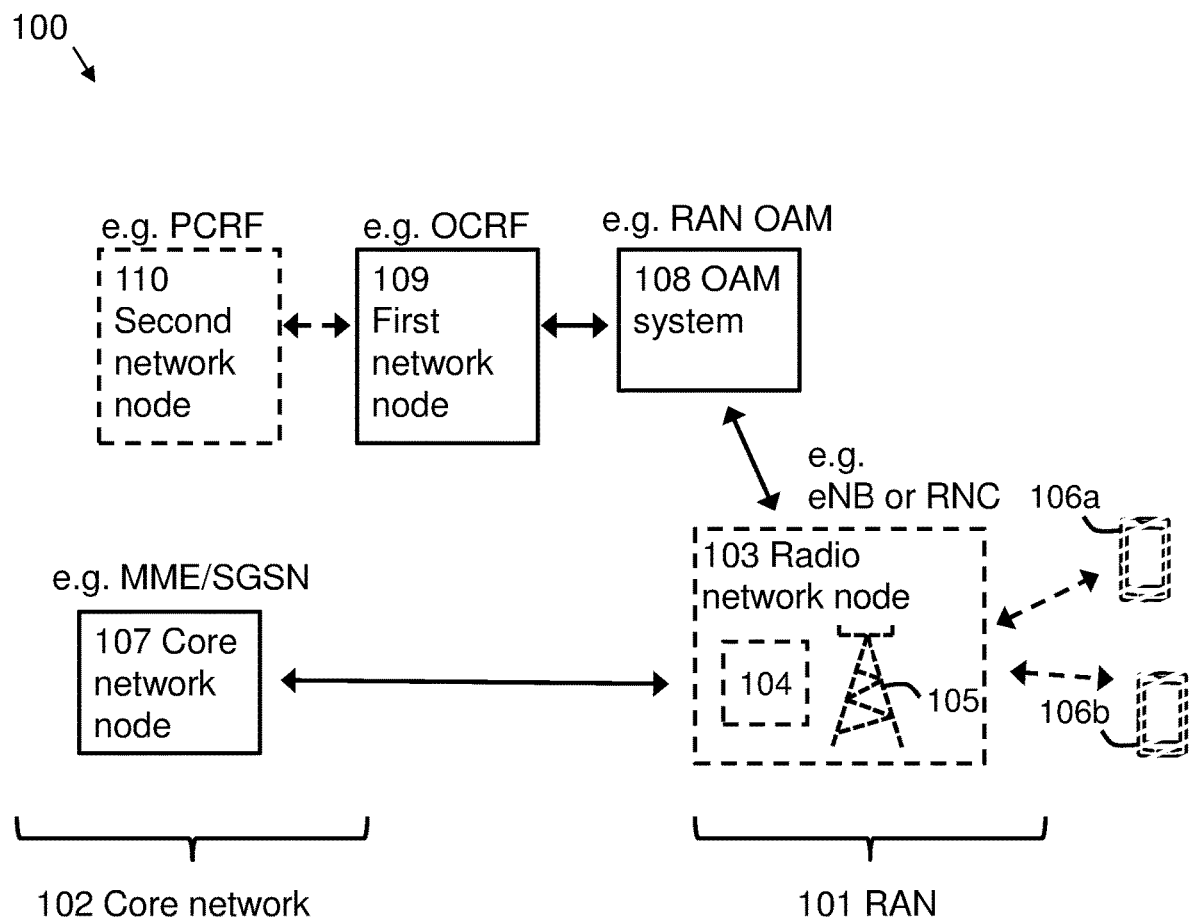
FIG. 1 is a block diagram schematically depicting an example of a wireless communication network in which embodiments herein may be implemented.

Throughout the following description similar reference numerals have been used to denote similar elements, units, modules, circuits, nodes, parts, items or features, when applicable. In the Figures, features that appear in some embodiments are indicated by dashed lines.

It has been realized that there are problems related to the solutions indicated in the Background. In short these problems include privacy concerns or even violation due to exposure information associated with UEs, also named wireless devices in the following, high implementation impact and high signalling load.

In brief, embodiments herein may be described as utilizing encryption to enable secure provision of information beneficial or even needed to be able to mitigate congestion, and in a manner that at the same time facilitates implementation in existing networks and enables low additional signaling load.

As part of the development towards embodiments herein, the situation and problems indicated in the Background will first be further discussed.

The proposed solution 1.5.5 is problematic for the 3G case. Even though the IMSI may be available in the RNC, it may not be used to collect the list of UEs affected by congestion due to privacy concerns. The IMSI and related location information may not be collected unless explicit user consent is given, as administered in the Home Subscriber Server (HSS). This has been discussed already in SA3/SA5 for scenarios such as Minimization of Drive Tests (MDT). See for example TS 34.422 section 4.6 which states:

"Getting user consent before activating the MDT functionality is required because of privacy and legal obligations. It is the Operator responsibility to collect user consent before initiating an MDT for a specific International Mobile Subscriber Identities (IMSI) or International Mobile Equipment Identity (IMEI) number. Collecting the user consent shall be done via customer care process. The user consent information availability should be considered as part of the subscription data and as such this shall be provisioned to the HSS database."

Hence, getting the IMSIs from the 3G RAN OAM is regarded as a violation of the user's location privacy.

It may be possible to use a similar approach for 3G as proposed for LTE, i.e. provide the location information from RCAF to SGSN so that the SGSN supplies the list of UEs in the given location. However, a difference in 3G compared to LTE is that the SGSN is by default not aware of the UEs at a specific location. In order for the SGSN to get that information, the location reporting function has to be switched on for all UEs on the Iu interface. But that causes a heavy signaling load, which is not desirable.

Even if the location is reported to the SGSN, the 3G location is only available on a per Service Area (SA) granularity, where a Service Area contains multiple cells.

This restricts the applicability of the solution, since the congestion situation may be different at different cells within a Service Area.

Solution 1.5.5 has other disadvantages which apply to both the 3G and the LTE case. The Nq/Nq' interface represents a high impact, i.e., a new interface is defined in the architecture, which needs substantial standardization and implementation work. The interface also implies a relatively high signaling load.

Also, for the RCAF it is less efficient to get some information, such as about congested cells, from one source and other information, such as a list of UEs per cell, from another source. Such an approach makes it hard to handle special cases, e.g. when a UE belongs to multiple cells, or to consider cases when different UEs within a cell experience different levels of congestion.

Solution 1.5.4 requires cell level location information to be conveyed to the node comprising the PCRF, i.e. a PCRF node. That is known to cause signaling load issues, since location information can change relatively frequently. Signaling such location changes to a node that is high up in the architecture hierarchy, such as the PCRF, is too costly from a signaling load point of view. It does not help to reduce the signaling to the PCRF if we use the user plane to convey the location information, since the PCRF would anyway get the location signaling over the control plane, e.g. using the so called Gx interface.

A draft S3-140882/S3-14yyyy, revision of S3-13abcd, from 3GPP TSG SA WG3 (Security) Meeting #75, 12-16 May 2014, Sapporo, Japan, discloses that a way to mask the users identity when the RAN needs to be able to correlate information about specific terminals or users is to use Type Allocation Code (TAC) and Software Version Number (SVN) parts of the IMEI Software Version (IMEISV) to the eNB, or sending only the TAC and SVN parts and some digits of the six-digit Serial Number (SNR) that may be required for identifying a particular terminal model. It would be sufficient to know which SNR digits are needed at maximum for identifying a particular terminal model. This approach may not always be applicable since there is a risk that multiple terminals would match a certain combination of values. Further, if very few terminals are present in a specific area, even knowing the model of the phone and/or software version number may uniquely identify a user, so privacy may still be at risk. For example, if there is only one smart phone user in a certain area, the model of the smart phone gives the user identity away.

A draft S3-140893/S3-140yzw from 3GPP TSG SA WG3 (Security) Meeting #75, 12-16 May 2014, Sapporo, Japan, also discusses the possibility to use the TAC and SVN. Moreover, it also mentions that the SNR digits of the IMEI could be used, but like the proposal in the previous paragraph it fails to identify the risk that privacy may still be at risk.

Embodiments herein will be discussed in some detail below. It should be noted that these embodiments are not mutually exclusive. Components from one embodiment may be tacitly assumed to be present in another embodiment and it will be obvious to a person skilled in the art how those components may be used in the other exemplary embodiments.

FIG. 1 is a schematic block diagram schematically depicting an example of a wireless communication network 100 in which embodiments herein may be implemented. The wireless communication network 100 is typically a telecommunication system, such as a cellular communication network that may be based on LTE and/or UMTS. The wireless communication network 100 comprises a RAN 101 and a core network (CN) 102.

A radio network node 103 is shown comprised in the RAN 101. The radio network node 103 may be or comprise a base station 105, e.g. a RBS, eNB, NodeB, and/or be or comprise a controlling radio node 104, e.g. a RNC, which may control one or more base stations, including e.g. the base station 105.

The radio network node 101 may serve and/or control and/or manage one or more wireless devices, e.g. UEs, such as wireless devices 106a-b shown in the figure. This may be done directly when being the base station 105 or via one or more base station when being the controlling node 104.

The core network further comprises a core network node 107.

In the case of an UMTS based cellular communication system the RAN 101 may be referred to as UTRAN. The core network node 107 may be a SGSN.

In case of an LTE based cellular communication system the RAN may be referred to as E-UTRAN and the core network as an Evolved Packet Core (EPC). The core network node 107 may be a Mobility Management Entity (MME).

Further, the wireless communication network 100 comprises an OAM system 108. A part of the OAM system involved in communication with the first network node may be specifically associated with the RAN 101 and may be referred to as RAN OAM system or simply RAN OAM. The OAM system in general comprises functionality and interfaces for an operator of the wireless communication network 100 to operate, administrate, maintain and manage the wireless communication network 100. The RAN OAM is associated with the RAN 101 and responsible for operation, administration, maintenance and/or management of RAN nodes, i.e. nodes comprised in the RAN, or in other words radio network nodes, such as the radio network node 103.

Moreover, the wireless communication network 100 comprises a first network node 109. For some embodiments herein, the first network node is referred to as an OAM Congestion Reporting Function (OCRF) node. The first network node may be configured to act on information from the OAM system and may therefore be considered an OAM based entity. However, it may be a logically separate node from the OAM system and/or may have its own (hardware and/or software) security protection. The first network node may but need not be comprised in or be part of the core network 102.

Additionally, the wireless communication network 100 may comprises one or more second network nodes, e.g. one or more PCRFs, represented by a second network node 110 in the figure.

Figure 2:
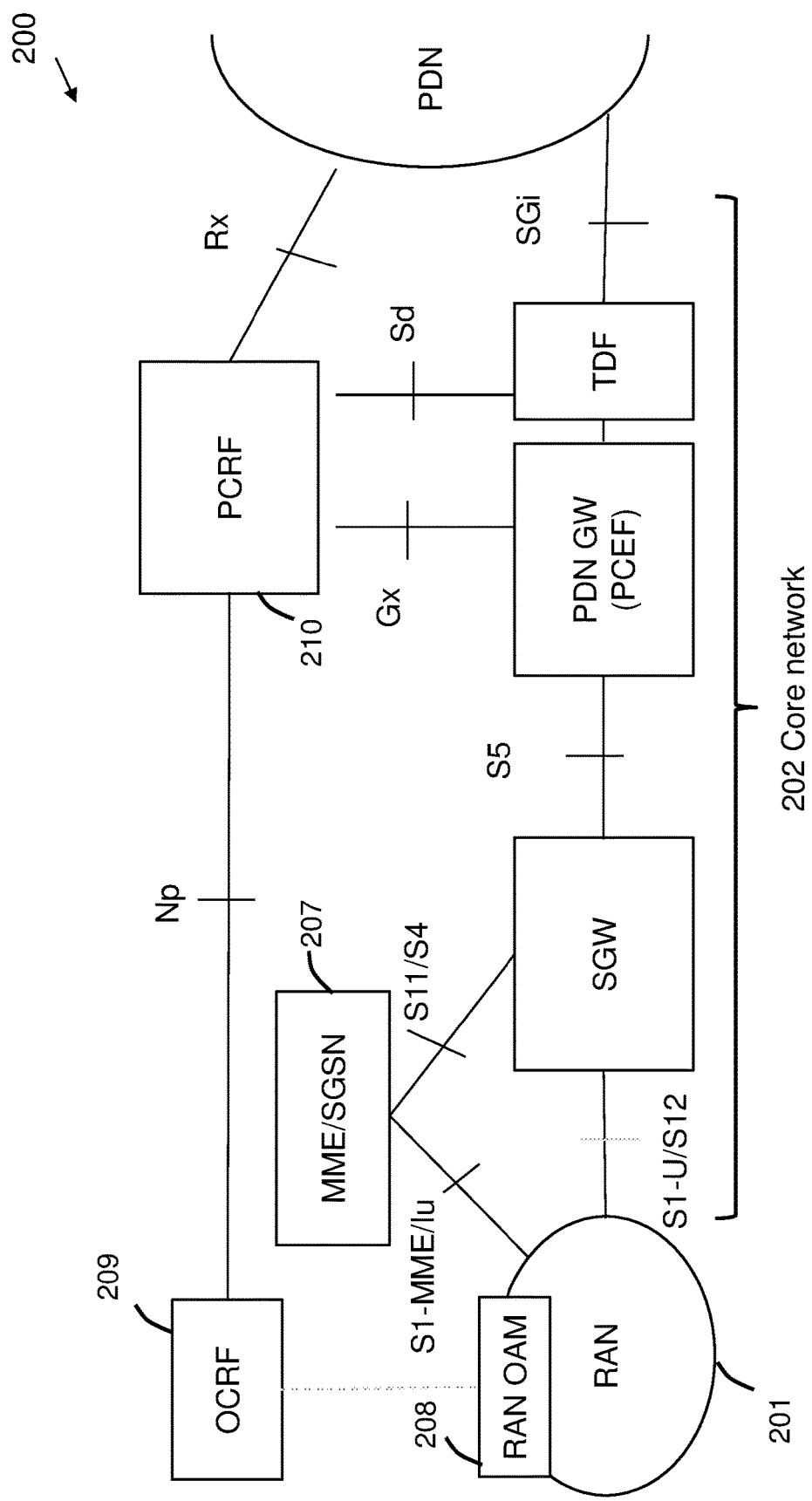
FIG. 2 is a block diagram schematically depicting an example, specifically for the case of LTE and UMTS, of a wireless communication network in which embodiments herein may be implemented.

FIG. 2 is a schematic block diagram schematically depicting a wireless communication network 200 as another more detailed example of a wireless communication network in which embodiments herein may be implemented. The example is specifically for the case of LTE and UMTS, where the former may also be named 4G and the latter may also be named 3G. Nodes and interfaces are exemplified by specific denominations that at least partly correspond to naming that is known to the skilled person from standard specifications regarding LTE and UMTS. The wireless communication network 200 may be considered a detailed example of the wireless communication network 100. For example, the wireless communication network 200 comprises: a RAN 201 that is an example of the RAN 101, a core network 202 that is an example of the core network 102, a RAN OAM system 208 that is an example of the OAM system 108, a MME or SGSN 207 that is an example of the core network node 107, an OCRF node 209 that is an example of the first network node 109 and a PCRF node 210 that is an example of the second network node 110.

Attention is drawn to that FIGS. 1 and 2 are only schematic and for exemplifying purpose and that not everything shown in the figure is required for all embodiments herein, as will be evident from the below. Also, a wireless communication network that in reality corresponds to any of the wireless communication networks 100, 200 typically comprises several further network nodes, base stations, cells etc., as realized by the skilled person, but which are not shown herein for the sake of simplifying.

Figure 3:
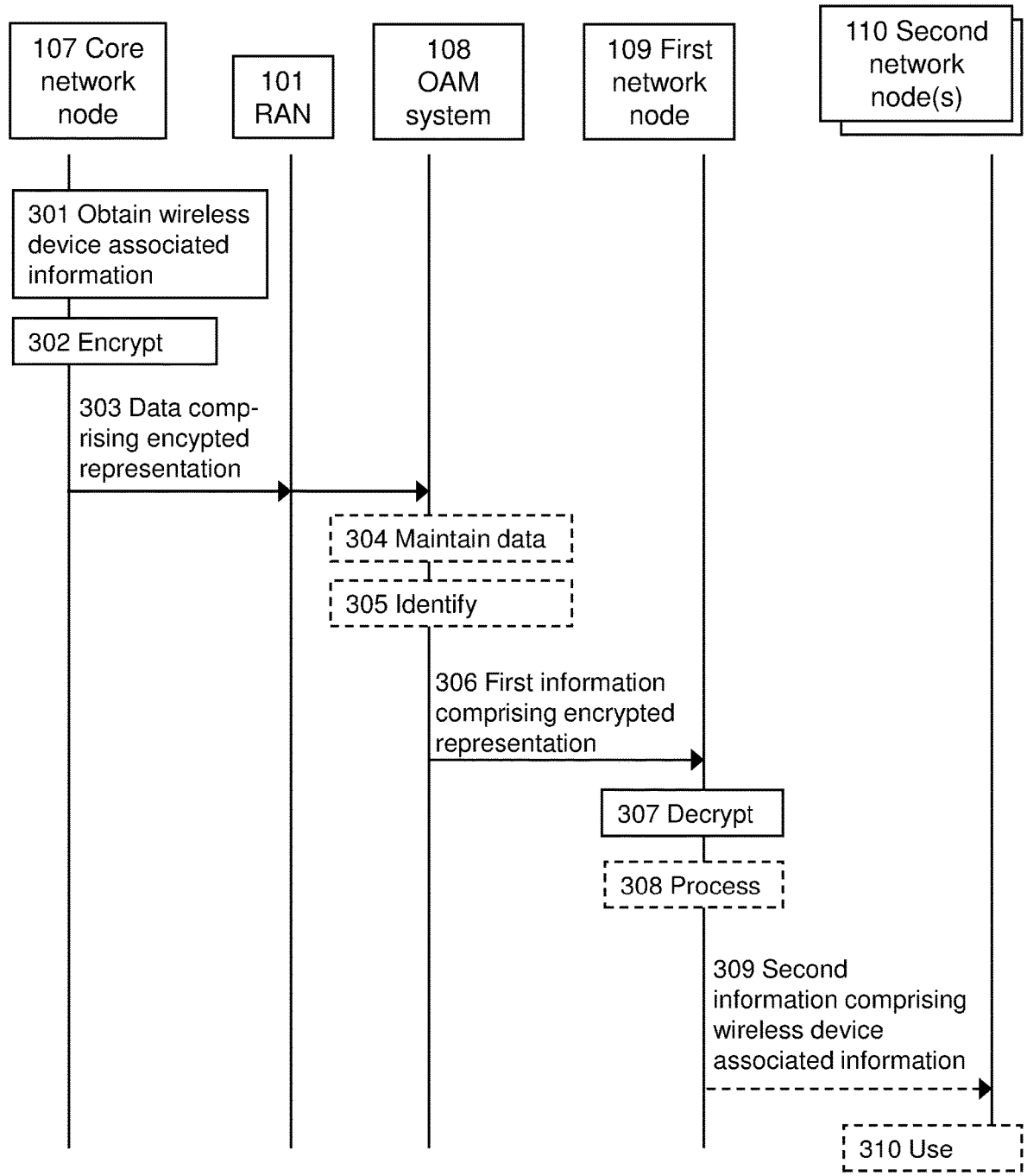
FIG. 3 is a combined signaling diagram and flowchart for describing embodiments herein.

FIG. 3 schematically depicts a combined signaling diagram and flowchart showing actions relating to various nodes. Part of the figure discloses method actions for illustrating embodiments performed in the core network node 107 and the first network node 109. The methods are for managing wireless device associated information, in particular for or as part of congestion handling.

The shown actions may be taken in any suitable order and/or be carried out fully or partly overlapping in time when this is possible and suitable. An arrow from a node corresponds to sending from that node. Arrow to a node corresponds to receiving in that node.

Action 301

The core network node 105 obtains wireless device associated information.

The wireless device associated information may comprise identities of one or more wireless devices, e.g. the wireless devices 106a-b, and/or may comprise other information specific for individual wireless devices. The wireless device identities may identify wireless devices in the wireless communication system 100 or even in multiple wireless communication systems, e.g. internationally and/or even globally. The wireless device identities may uniquely identify the wireless devices. The wireless device identities may be based on or be International Mobile Subscriber Identities (IMSI) or International Mobile Equipment Identity (IMEI).

Action 302

The core network node 105 encrypts the wireless device associated information into an encrypted representation.

One or more decryption keys for decryption of the encrypted representation is accessible by the first network node 109.

The encrypted representation may be accomplished using an encryption seed that may be changed compared to another encryption seed previously used for encrypting, whereby the encrypted representation is changed compared to a previous encrypted representation.

The encryption seed may be changed for example in response to one or more of the following events:

at each different encryption occasion, when a wireless device associated with wireless device associated information has its context established in the RAN 101 at an idle state to connected state transition, when a wireless device, e.g. any one of the wireless devices 106a-b, associated with the wireless device associated information is subject to a handover, and when a timeout period has expired.

Action 303

The core network node 105 sends, to the OAM system 108 via the RAN 101, data comprising the encrypted representation. The OAM system 108 receives the data.

The data comprising the encrypted representation of the wireless device identities are in some embodiments herein exemplified and/or referred to as Identifier Assistance Data (IAD).

The wireless device associated information and/or said data may further comprise one or more access point identifiers, e.g. access point names (APNs), which may identify one or more packet data networks. APNs were discussed in the Background. An APN may thus identify an external network that a wireless device is connected to and the APN may be needed to know to which packet data network a congestion mitigation action should apply to. An APN may also be used, or even be needed, to determine a proper PCRF, such as the PCRF node 210 being an example of the second network node 110. In LTE, the APN associated with a wireless device may be determined from the MME, e.g. the MME 207 being an example of the core network node 107, using the Nq interface. In UMTS and 3G the APN associated with a wireless device may be determined from the SGSN, e.g. the SGSN 207 also being an example of the core network node 107, using the Nq' interface.

Communication via the RAN 101, e.g. said sending of the data comprising the encrypted representation to the OAM system 108 via the RAN 101, may be via a radio network node, e.g. the radio network node 103, directly or indirectly communicatively connected to one or more wireless devices, e.g. the wireless devices 106a-b, that may be wireless devices associated with the wireless device associated information. When indirectly communicatively connected this may be via one or more other radio network nodes that in turn are communicatively and wirelessly connected to the one or more wireless devices, e.g. the controlling node 104 connected to the base station 105.

Action 304

The OAM system 108 may maintain, e.g. store and/or keep updated, the data comprising the encrypted representation and/or the encrypted representation and/or at some later point send it to the first network node. Maintaining the data and/or the encrypted representation may involve collecting data and/or the encrypted representation associated with multiple wireless devices.

Action 305

The OAM system 108 may identify congestion, or at least a situation relating to congestion, and/or may identify a group of wireless devices associated with, e.g. affected by, congestion.

Action 306

The OAM system 108 sends, to the first network node 109 that receives, the encrypted representation of the wireless device associated information.

The encrypted representation may be comprised in first information when sent and received in the present action, which first information is associated with a group of wireless devices that, e.g. the group identified in Action 305, i.e. the group that was associated with, e.g. affected by, congestion. In other words, the OAM system 108 may first identify a group of wireless devices that are affected by congestion and use the encrypted representation of the wireless device associated information for the wireless devices of this group to send information about, e.g. identities of, these wireless devices to the first network node 109.

Hence, the first information may be associated with the group of wireless devices by comprising the encrypted representation and possibly one or further encrypted representations. The encrypted representation(s) may be encrypted wireless device associated information, which wireless device associated information comprises identities of the group of wireless devices.

The first information may be congestion information, i.e. may be information relating to said congestion, such as information useful or needed for mitigating said congestion. As already mentioned, the group of wireless devices may have been identified as associated with congestion by the OAM system 108. The first information may be sent by the OAM system 108 to the first network node 109 in response to the identification.

Further, the encrypted representation sent to and received by the first network node 109 in the present action may be comprised in the same data, e.g. IAD, as received by the OAM system 108 in Action 303.

Hence, the present action may involve that said data and/or the encrypted representation are/is comprised in the first information as discussed above. The data and/or the encrypted representation may be sent to the first network node in response to that the OAM system 108 in Action 305 has identified congestion, or at least said situation relating to congestion, and/or identified said group of wireless devices associated with congestion.

Action 307

The first network node 109 decrypts the encrypted representation using one or more decryption keys accessible by the first network node.

Access to the one or more decryption keys may be restricted so that specifically, and/or even only, the first network node 109 can access them. The one or more decryption keys may e.g. be stored in and/or may be arranged for specific access by the first network node 109. The first network node 109 typically has pre-configured access to said one or more decryption keys.

Action 308

The first network node 109 may process at least part of the first information into additional information. The processing is further discussed separately below, after Action 310.

Action 309

The first network node 109 may send, after the decryption in Action 307, the wireless device associated information to one or more second network nodes, e.g. to the second network node 110, for further use, such as discussed for Action 310 below. The second network node 110 may thus receive the wireless device associated information.

The wireless device associated information may be comprised in second information when sent to said one or more second network nodes in the present action. The second information may comprise additional information that may be based on the first information, e.g. resulting from the processing in Action 308 and/or forwarding by the first network node 109 of at least part of the first information.

The one or more second network nodes may be such identified by the first network node 109 based on the wireless device associated information and/or said first information, e.g. one or more wireless device identities and/or one or more access point identifiers, e.g. APNs, comprised in the wireless device associated information or in said first information. The one or more access point identifiers may identify one or more packet data networks associated with mitigation of the congestion.

Action 310

The one or more second network nodes, e.g. the second network node 110, may use the wireless device associated information and may use said additional information.

The use may involve congestion mitigation, e.g. taking decisions on congestion mitigation and/or congestion mitigation by application of rules for congestion mitigation, based on the second information comprising the wireless device associated information and the additional information.

When the additional information results from processing in Action 308, i.e. processing of the first information into the additional information, the processing may comprise one or more of the following:

converting to a suitable format for the receipt and/or further use by said one or more second network nodes, e.g. the second network node 110, analyzing when a congestion status has changed and reporting the changes to the one or more second network nodes, e.g. the second network node 110, applying functions related to finding appropriate one or more second network nodes, e.g. the second network node 110 aggregating information per second network node and thereby reduce signaling, and averaging information spatially and/or in time.

The encryption and decryption described above in relation to FIG. 3 enable reduction of privacy concerns related to prior art solutions for congestion handling, in particular the RAN 101 need not be exposed to any wireless device associated information in clear text.

Even the risk that e.g. change patterns caused by mobility and or connections to the wireless communication network 100 can be used to derive information about UEs, e.g. any one of the wireless devices 106*a-b*, may be avoided through the above described handling relating to the encryption seed. Wireless device associated information comprising e.g. an identity of a wireless device will be encrypted before it is sent to the RAN 101 and the encrypted representation thereof may be adjusted using the encryption seed, that may correspond to a freshness-value, which may change for example at user mobility and/or at idle to connected state transition.

Also, specification impact as well as implementation impact of embodiments herein are low since, as indicated below, it may suffice to introduce a new IE, i.e. sending of some new information, rather than e.g. defining and implementing a new interface as in some prior art solutions.

Moreover, thanks to the embodiments herein, the OAM system 108 may be used as a single source to collect all congestion related data and may initiate mitigate of congestion through the first network node 109, such as the OCRF node 209. This corresponds to a simplification and also enables possible performance enhancements. As mentioned, at the same time user privacy is maintained.

Embodiments and related information will next be exemplified in some further detail, in particular in the context of for LTE and UMTS and with reference to FIG. 2 in particular.

Embodiments herein enable a lightweight solution for obtaining a list of wireless devices, UEs, in a node corresponding to a RCAF node, herein called an OAM Congestion Reporting Function (OCRF) node, e.g. the OCRF node 209. This node may provide OAM Congestion Reporting Function via the RAN OAM system 208. The list may indicate which UEs are affected by congestion. The list of UEs may be provided with the help of OAM data and suitable assistance data in a RAN, e.g. the RAN 201, that can be used for this purpose. It is proposed to convey Identifier Assistance Data (IAD) to the RAN 201, which IAD is intended for an efficient UPCON off-path approach. Specifically, an encrypted representation of the IMSI may be sent to the RAN 201 as or comprised in IAD.

Using a fresh seed for encryption, encrypted IMSI representation in the RAN 201 may be changed each time a UE context is established in the RAN 201 at idle to connected transition. Also, the encrypted IMSI representation in the RAN 201 may change upon user mobility.

In this way, location tracking becomes impossible, avoiding any privacy issues. The RAN 201 and the RAN OAM system 208 would not be exposed any additional UE identifier. The RAN 201 and RAN OAM system 208 would only be exposed to the IAD, from which it is impossible to derive the UE identifier or track mobility.

Should any intruder have access to the IAD, it would not lead to privacy concerns as it only appears as a random bit pattern. Only the OCRF node 209 may be configured with keys to decrypt the encrypted representation and/or the IAD, so that the list of UEs may be made available where it is needed.

The APN information may also be transferred to the RAN 201, to be collected by the RAN OAM system 208 and provided to the OCRF node 209 for the affected UEs. A similar security protection for APN information may be optional since there are less security risks with exposing the APN information.

The above solution approach has a low specification impact, as it may only require a new IE to be conveyed to the RAN 201, rather than defining a new interface (c.f. Nq as in solution 1.5.5) for conveying the list of affected UEs and APNs. Consequently, the solution has a low implementation complexity. This approach enables the use of a single information source to collect all congestion related data, which is not only a simplification but also enables possible performance enhancements. It does all this while still marinating user privacy.

An MME node, e.g. the MME 207, may send the following additional information to the RAN, e.g. the RAN 201 or the radio network node 103.

IAD=(Key-ID, freshness-value, E(key, freshness-value, IMSI)), where:
- The Key-ID tells the OCRF, e.g. the OCRF node 209, which key to decrypt the IAD with.
- The freshness-value is some random string that the MME 207 may changes from time to time, so that privacy is preserved: the IAD values can be unique.
- E(k, IV, data) is an encryption function like, e.g. AES in counter mode, where k is the encryption key, IV is the initialization vector, and data is the data to encrypt.

The IAD may be collected by the RAN 201 and the RAN OAM system 208, and be transferred to the OCRF node 209. The keys may be configured into the OCRF node 209, which may be achieved e.g., by manual configuration, or using automated key distribution mechanisms. The OCRF node 209 may perform the decryption as follows:

IMSI=D(key, freshness-value, IAD), where:
- Key-id is used to determine the appropriate key for decryption.
- Freshness-value is the initialization vector.
- D(key, freshness-value, data) is the decryption function corresponding to E.

The Key-ID is not mandatory in all embodiments. In case there is no ambiguity about which key is used, e.g., the same key is used for all MMEs or for a group of MMEs, then there is no need for a Key-ID to either be transmitted nor to be used by any of the nodes. In some embodiments the Key-ID may be implicitly determined by the OCRF node 209. This may be the case in scenarios where there may be one key per MME pool, and the OCRF node 209 may determine which MME pool is generated the IAD. This is possible if there is only one MME pool area corresponding to the OCRF node's geographical area in which case the MME pool area is unique per OCRF node. Alternatively, if there are multiple MME pool areas per OCRF's geographical area but MME pool areas do not overlap, then the OCRF node 209 can derive the MME pool area based on the location of the UE that is provided from the RAN OAM system 208.

The freshness value may be a random value generated by the MME 207 to be fresh for every encryption. It could also be a random value generated by the MME but which is re-used for several encryptions. In some embodiments it is a timestamp. It may be a timestamp that changes with regular intervals that are long enough for the OCRF node 209 to be able to make a sufficiently accurate guess about when the encryption was made. If that is the case, the timestamp need not be transmitted from the MME 207. If decryption fails to produce meaningful results at the OCRF node 209, the OCRF node 209 may attempt to use a previous timestamp. When no freshness value is transmitted, it naturally does not get included in the IV. The freshness value may be a counter. The freshness value may be generated by another node and then being used by the MME 207. For example, the MME 207 may use an existing parameter as a freshness value instead of generating a new one, provided that the parameter is fresh when needed.

The IV may contain other parameters than the freshness value. A function may be applied to the freshness parameter and possibly other parameters before being input to the IV.

In some embodiments the freshness value affects the encryption by first being combined with the key, instead of entering the encryption via the IV. More precisely, the MME 207 may derive a key k'=KDF(k, f(freshness value)), where KDF is a Key Derivation Function, and f is any function of the freshness value; f may even be the identity function. Further, f may take other parameters as input in addition to the freshness value. The actual encryption may then be performed by encrypting the IMSI using k' as the encryption key.

Even though it hitherto has mainly been discussed the terminal and user being identified by the IMSI, it should be obvious for the skilled person that any other identifier that sufficiently uniquely identifies the terminal or the user can be used in its place. Examples of such identifiers are IMEI, IMEI Software Version (IMEISV), Globally Unique Temporary UE Identity (GUTI), S-Temporary Mobile Subscriber Identity (S-TMSI), P-Temporary Mobile Subscriber Identity (P-TMSI).

In order to increase the level of security, multiple keys may be used. The following options, or a combination of them, may be used:
- Keys may be limited in time and be refreshed with a new key after a period of usage
- Separate keys may be used for each MME node or group of MME nodes (such as an MME pool), in order to reduce the negative effect of one key being compromised.
- Separate keys may be used for a group of IMSIs. This may be achieved by using a hash function to map the IMSIs to a group, and using separate keys for each of these groups. This may also reduce the impact of compromising a key.

There may be several options regarding how often a new freshness-value is used when IAD is determined at, e.g. by, the MME 207 to be sent to a eNB, e.g.:
- The highest level of location privacy is reached if a new freshness-value is used each time the RAN context is set up during an "idle to connected" transition, and each time the UE moves from one eNB to another eNB. Further, it is possible to refresh the IAD at the eNB after a timeout has expired while the UE remains connected at a single eNB.

It may be possible to use the same IAD in case the UE returns to connected mode to the same eNB that it used earlier. This can be determined if the MME 207 stores the eNB id, or the cell id or any other identifier that can be mapped back to the eNB where the UE was located before it went idle. This could reduce the computational burden on the MME 207.

It may also be possible to limit the frequency of how often the IAD is changed for a given UE with a new freshness value. E.g., the same freshness-value could be used for a given amount of time; or for a given number of idle to connected transitions, or for a given number of handovers. Such limitations could also reduce the MME 207 computational effort. Appropriate MME configuration is used to determine the frequency of freshness-value changes.

With support from FIG. 4 it is below discussed how the embodiments herein may be used in an LTE based wireless communication network, e.g. such with architecture described in 3GPP TS 23.401, version 12.4. The signaling chart of the figure shows a Service request procedure, which is executed at transitions from idle to connected mode. See section 5.3.4.1 in 3GPP TS 23.401, version 12.4, for further information and description of the procedural steps.

The sending of the IAD from the MME, e.g. the MME 207, to an eNB of the RAN, e.g. the RAN 201, may be performed in step 4 of FIG. 4. The IAD may be added to the S1-AP Initial Context Setup Request message as an additional IE, which may be stored on a per UE basis in the eNB's UE context.

The APN may also be added in step 4 as another new IE in the same message. The APN name may be helpful to provide, because it may be used in combination with the IMSI for e.g. selection of the appropriate PCRF node. The APN does not necessarily need to be encrypted, as it may be assumed to be common for a large group of UEs and hence no privacy threat may be related to exposure of the APN name.

However, the encryption of APN name is not excluded in embodiments herein. In some embodiments, the APN name is encrypted in a similar way as proposed for the IMSI.

Also, it is possible to encrypt the IMSI and the APN name together and include the result in a single IAD parameter—which approach provides privacy for the APN name and reduces the number of new information elements into a single one.

One example which may motivate the encryption of APN names in certain networks is the use of corporate APNs, where in some cases the number of users per corporate APN may be rather small and hence the location of that group of users might be desirable to protect. Note that the APN information is to be transferred on a per bearer basis, i.e., the APN may be different for the different bearers of the same UE.

FIG. 5 illustrates the so called X2 handover procedure without SGW relocation, which is the most commonly used handover procedure in LTE. Refer to section 5.5.1.1.2 of 3GPP TS 23.401, version 12.4, for a further explanation of the procedure.

In the handover preparation phase, the UE context is transferred from a source to a target eNB. The IAD, and possibly the APN if that is also stored separately in the UE context, may also be transferred from the source eNB to the target eNB.

In a step 6, Path Switch Request Ack message, a new IAD, possibly in combination with the APN if required, may be transferred from a MME, e.g. the MME 207, to the target eNB in a new IE, or two new IEs if the APN is sent separately. The new information may overwrite the old information that the UE context that was received during handover preparation. As discussed earlier, it may be possible to avoid the sending of new IAD and/or APN at every single handover event, in which case the new information elements would not be added in all cases. However, in cases when the MME 207 sends a new IAD and/or APN at every handover, then sending the IAD and/or APN during handover preparation from the source eNB to the target eNB may be avoided due to the fact that it would be overwritten anyway.

In case encryption is not applied to the APN information, it is possible to not send the APN during Path Switch Request Ack message in the handover procedure and instead just rely on the handover preparation phase to transfer the APN information to the target eNB.

There are a number of other handover procedures described in 3GPP TS 23.401, version 12.4, for which the skilled person based on the above is able to apply the same principles as described above. How to do this will not be discussed in any detail in relation to embodiments herein.

In the case of 3G, the same principles as described above for LTE are also applicable, e.g. to send the IAD, possible in combination with the APN, during the service request procedure, or during handover procedure from the SGSN to the RNC. Additionally or as an alternative, the IAD and/or APN when applicable, may be sent as part of the Common ID procedure, as a new information element.

Due to the fact the in the 3G case, the RNC entity is more central and the UE may stay for a longer period of time at one and the same RNC, the IAD information may be refreshed even though the UE has not moved or has not performed a service request. This may be achieved by using a timer in the SGSN to set a time period after which the IAD is to be refreshed. In cases when location reporting is used from RNC to SGSN, a change in the UE location may also trigger a refresh of the IAD from the SGSN. Additionally or alternatively, the RNC may trigger the refresh of the IAD by a signaling message from the RNC to the SGSN. This may be triggered by a timeout, or by detecting UE mobility where a threshold may be set on the extent of mobility which triggers a refresh.

Above it has been described how the IAD, possibly in combination with the APN, may be used in the RAN 201. The RAN OAM system 208 may collect this information on a periodical basis, e.g. a set of IADs and APNs per cell or per a given area may be collected by the RAN OAM system 208, and this information may further be provided to OAM based entities such as the OCRF node 209. Using decryption keys e.g. configured into the OCRF node 209, the IAD can be decrypted and e.g. deduce the IMSIs as described above.

The configuration of encryption related keys into the OCRF node 209 as well as into the MME or SGSN 207 may e.g. be done based on, such as by, from or via, the OAM system 108, e.g. the RAN OAM system 208. Other ways of handling and/or configure the keys may be based on downloading from a central repository or exchanging the keys directly, e.g. between the OCRF node 209 and one or more MME or SGSN nodes, such as the MME or SGSN node 207.

Even though it above mainly has been discussed collection of the IAD by the RAN OAM system 208 which then provision it to OAM based entities such as the OCRF node 209, it is obvious for the those skilled in the art that other information collection nodes, different from the RAN OAM system 208 and RAN OAM based entities such as the OCRF node 209, may alternatively be involved.

Figure 6A:
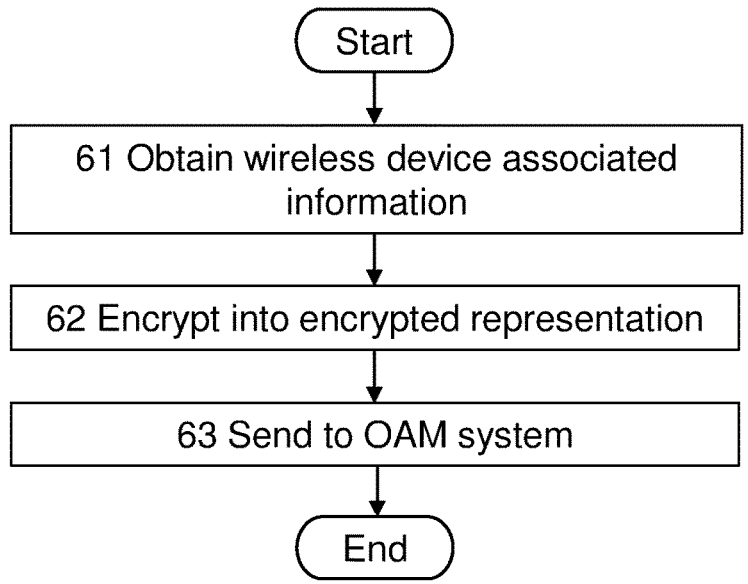
FIG. 6a is a flowchart schematically illustrating embodiments of a method performed in a core network node.

FIG. 6a is a flow chart schematically illustrating embodiments of a method performed by a core network node, e.g. the core network node 107 or the MME or SGSN 207, for managing wireless device associated information. For the sake of simplifying, the method is described in the following with references to FIG. 1 with the core network node 107 exemplifying the first network node that performs the method. The core network node 107 is comprised in a core network, e.g. the core network 102, of a wireless communication network, e.g. the wireless communication network 100. Said wireless communication network further comprises a RAN, e.g. the RAN 101, and an OAM system, e.g. the OAM system 108.

The method comprises the following actions, which actions may be taken in any suitable order and/or be carried out fully or partly overlapping in time when this is possible and suitable.

Action 61

The core network node 107 obtains said wireless device associated information.

The wireless device associated information may comprise identities of one or more wireless devices, e.g. one or more of the wireless devices 106a-b, and/or may comprise other information specific for individual wireless devices, such as the wireless devices 106a-b.

The wireless device associated information and/or said data may comprise one or more access point identifiers identifying access points comprised in the wireless communication network 100.

This action may fully or partly correspond to Action 301 above.

Action 62

The core network node 107 encrypts the wireless device associated information into an encrypted representation. One or more decryption keys for decryption of the encrypted representation is accessible by another, first network node, e.g. the first network node 109, comprised in the wireless communication network 100.

Access to said one or more decryption keys may be restricted with said one or more decryption keys stored in and/or being arranged for specific access by the first network node 109.

The encrypted representation may be accomplished using an encryption seed that is changed compared to another encryption seed previously used for encrypting, whereby the encrypted representation is changed compared to a previous encrypted representation.

The encryption seed may be changed in response to one or more of the following events:
  at each different encryption occasion,
  when a wireless device, e.g. any one of the wireless devices 106a-b, associated with wireless device associated information has its context established in the RAN 101 at an idle state to connected state transition,
  when a wireless device, e.g. any one of the wireless devices 106a-b, associated with the wireless device associated information is subject to a handover, and
  when a timeout period has expired.

This action may fully or partly correspond to Action 302 above.

Action 63

The core network node 107 sends, to the OAM system 108, via the RAN 101, data comprising the encrypted representation.

This action may fully or partly correspond to Action 303 above.

Figure 6B:
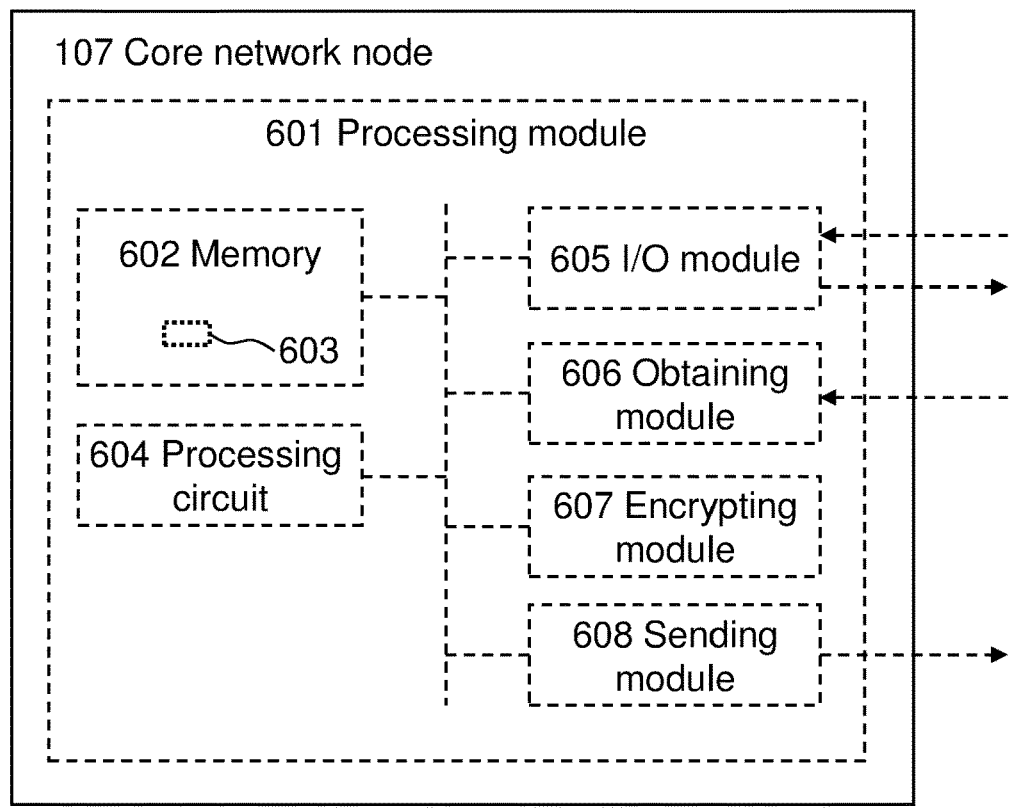
FIG. 6b is a functional block diagram for illustrating embodiments of the core network node.

FIG. 6b is a schematic block diagram for illustrating embodiments of the core network node 107 and how it may be configured to perform the method and/or one or more actions described above in relation to FIG. 6a. Hence, the core network node 107, which may be the MME or SGSN 207 as understood from the foregoing, may comprise:

A processing module 601, such as a means, one or more hardware modules, including e.g. one or more processors, and/or one or more software modules for performing said methods and/or actions.

A memory 602, which may comprise, such as contain or store, a computer program 603. The computer program comprises 'instructions' or 'code' directly or indirectly executable by the core network node 107 so that it performs the said methods and/or actions. The memory 602 may comprise one or more memory units and may be further be arranged to store data, such as configurations and/or applications involved in or for performing functions and actions of embodiments herein.

A processing circuit 604 as an exemplifying hardware module and may comprise or correspond to one or more processors. In some embodiments, the processing module 601 may comprise, e.g. 'is embodied in the form of' or 'realized by' the processing circuit 604. In these embodiments, the memory 602 may comprise the computer program 603 executable by the processing circuit 604, whereby the core network node 107 is operative, or configured, to perform said method and/or actions.

An Input/Output (I/O) module 605, configured to be involved in, e.g. by performing, any communication to and/or from other units and/or nodes, such as sending and/or receiving information to and/or from other external nodes or devices. The I/O module 605 may be exemplified by an obtaining, e.g. receiving, module and/or a sending module, when applicable.

In further embodiments, the core network node 107, e.g. the processing module 601, may comprise one or more of an obtaining module 606, an encrypting module 607 and a sending module 608, as exemplifying hardware and/or software module(s).

Therefore, according to the various embodiments described above, the core network node 107 and/or the processing module 601 and/or the obtaining module 606 are operative, or configured, to obtain the wireless device associated information.

Further, according to the various embodiments described above, the core network node 107 and/or the processing module 601 and/or the encrypting module 607 are operative, or configured, to encrypt the wireless device associated information into the encrypted representation.

Figure 7A:
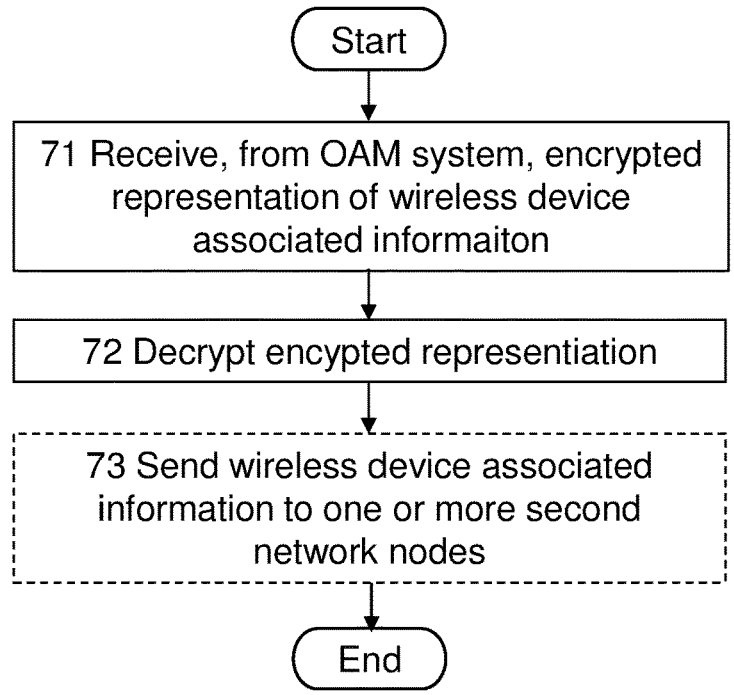
FIG. 7a is a flowchart schematically illustrating embodiments of a method performed in a first network node.

Moreover, according to the various embodiments described above, the core network node 107 and/or the processing module 601 and/or the sending module 608 are operative, or configured, to send to the OAM system 108, via the RAN 101, data comprising the encrypted representation FIG. 7a is a flow chart schematically illustrating embodiments of a method performed by a first network node, e.g. the first network node 109 or the OCRF node 209, for managing wireless device associated information. For the sake of simplifying, the method is described in the following with references to FIG. 1 with the first network node 109 exemplifying the first network node that performs the method. The first network node is comprised in a wireless communication network, e.g. the wireless communication network 100. The wireless communication network comprises an OAM system, e.g. the OAM system 108.

The method comprises the following actions, which actions may be taken in any suitable order and/or be carried out fully or partly overlapping in time when this is possible and suitable.

Action 71

The first network node 109 receives, from the OAM system 108, an encrypted representation of the wireless device associated information.

The wireless device associated information may comprises identities of one or more wireless devices, e.g. of one or more of the wireless devices 106a-b, and/or comprise other information specific for individual wireless devices, such as the wireless devices 106a-b.

The encrypted representation may have been accomplished using an encryption seed that was changed compared to a previously received encrypted representation, whereby the received encrypted representation is changed compared to said previously received encrypted representation.

The encryption seed may be changed in response to one or more of the following events:
at each different encryption occasion,
when a wireless device, e.g. any one of the wireless devices 106a-b, associated with wireless device associated information has its context established in the RAN 101 at an idle state to connected state transition,
when a wireless device, e.g. any one of the wireless devices 106a-b, associated with the wireless device associated information is subject to a handover, and
when a timeout period has expired.
The received encrypted representation of the wireless device associated information may be comprised in first information associated with a group of wireless devices affected by congestion.

This action may fully or partly correspond to Action 306 above.

Action 72

The first network node 109 decrypts the encrypted representation using one or more decryption keys accessible by the first network node 109.

Access to said one or more decryption keys may be restricted, with said one or more decryption keys stored in and/or being arranged for specific access by the first network node 109.

One or more second network nodes, e.g. the second network node 110, for using the wireless device associated information after decryption may be identified by the first network node 109 based on the wireless device associated information and/or the first information.

The wireless device associated information and/or said first information may comprise one or more access point identifiers identifying access points comprised in the wireless communication network 100.

This action may fully or partly correspond to Action 307 above.

Action 73

The first network node 109 may send, after the decryption, the wireless device associated information to one or more second network nodes, e.g. the second network node 110, comprised in the wireless communication network 100. This action may fully or partly correspond to Action 309 above.

Figure 7B:
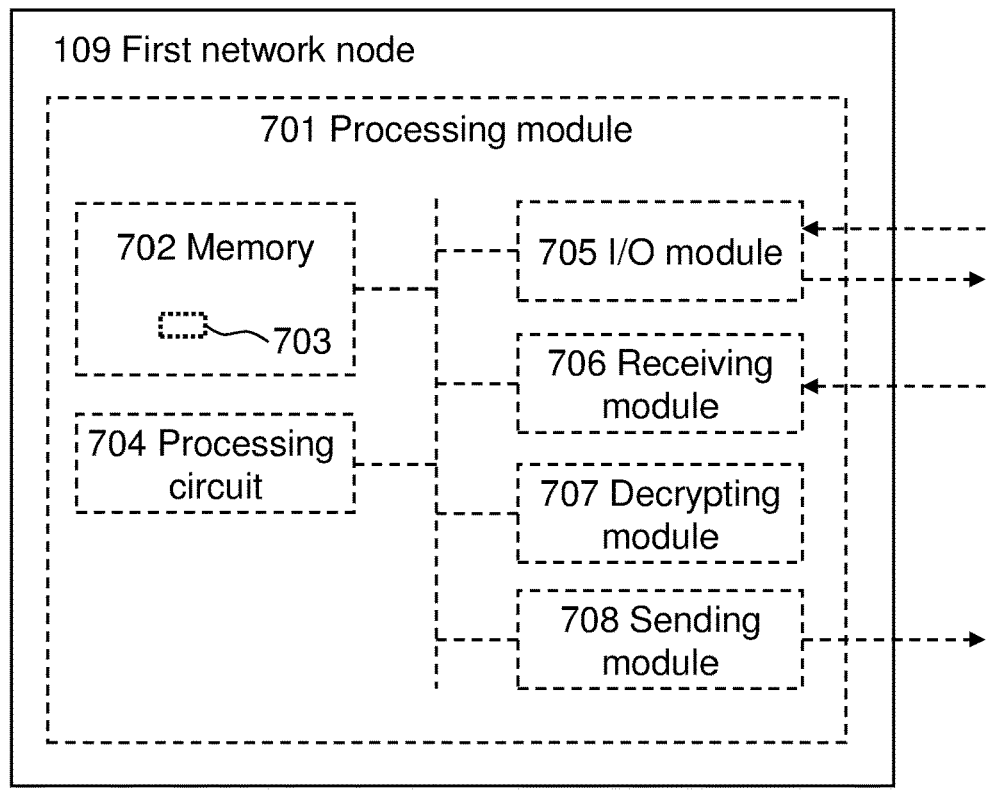
FIG. 7b is a functional block diagram for illustrating embodiments of the first network node.

FIG. 7b is a schematic block diagram for illustrating embodiments of the first network node 109 which may be the OCRF node 209 as understood from the foregoing, and how it may be configured to perform the method and/or one or more actions described herein relating to, e.g. performed by, the first network node 109. Hence, the first network node 109 may comprise:

A processing module 701, such as a means, one or more hardware modules, including e.g. one or more processors, and/or one or more software modules for performing said methods and/or actions.

A memory 702, which may comprise, such as contain or store, a computer program 703. The computer program comprises 'instructions' or 'code' directly or indirectly executable by the first network node 109 so that it performs the said methods and/or actions. The memory 702 may comprise one or more memory units and may be further be arranged to store data, such as configurations and/or applications involved in or for performing functions and actions of embodiments herein.

A processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby the first network node 109 is operative, or configured, to perform said method and/or actions.

An Input/Output (I/O) module 705, configured to be involved in, e.g. by performing, any communication to and/or from other units and/or nodes, such as sending and/or receiving information to and/or from other external nodes or devices. The I/O module 705 may be exemplified by an obtaining, e.g. receiving, module and/or a sending module, when applicable.

In further embodiments, the core network node 107, e.g. the processing module 701, may comprise one or more of an receiving module 706, a decrypting module 707 and a sending module 708, as exemplifying hardware and/or software module(s).

Therefore, according to the various embodiments described above, the first network node 109 and/or the processing module 701 and/or the receiving module 706 are operative, or configured, to receiving, from the OAM system 108, said encrypted representation of the wireless device associated information.

Further, according to the various embodiments described above, the first network node 109 and/or the processing module 701 and/or the decrypting module 707 are operative, or configured, to decrypt the encrypted representation using said one or more decryption keys accessible by the first network node 109.

Moreover, according to the various embodiments described above, the first network node 109 and/or the processing module 701 and/or the sending module 707 may be operative, or configured, to send, after the decryption, the wireless device associated information to said one or more second network nodes 110 comprised in the wireless communication network 100.

Figure 8A:
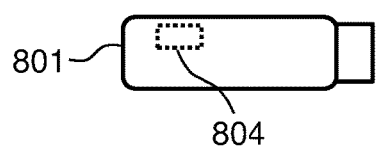
FIGS. 8a-c are schematic drawings illustrating embodiments relating to computer program products and computer programs to cause the core network node and the first network node to perform method actions.
Figure 8B:
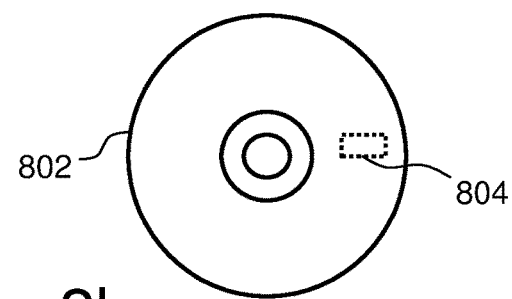
Figure 8C:
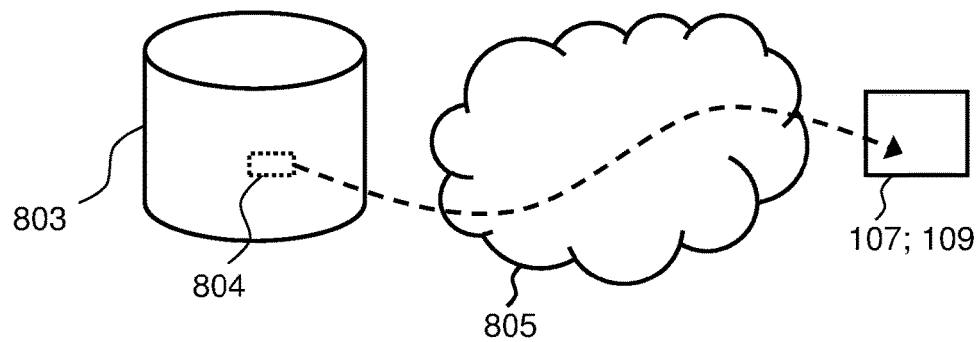

FIGS. 8a-c are schematic drawings illustrating embodiments relating to a computer program that may be any one of the computer programs 603 and 703, and that comprises instructions that when executed by the processing circuit 604 or processing circuit 704 causes the core network node 107 or the first network node 109 to perform the respective method as described above.

In some embodiments there is provided a computer program product, i.e. a data carrier, comprising a computer-readable medium and any one or both of the computer programs 603, 703 stored on the computer-readable medium. By computer readable medium may be excluded a transitory, propagating signal and the computer readable medium may correspondingly be named non-transitory computer readable medium. Non-limiting examples of the computer-readable medium is a memory card or a memory stick 801 as in FIG. 8a, a disc storage medium 802 such as a CD or DVD as in FIG. 8b, a mass storage device 803 as in FIG. 8c. The mass storage device 803 is typically based on hard drive(s) or Solid State Drive(s) (SSD). The mass storage device 803 may be such that is used for storing data accessible over a computer network 805, e.g. the Internet or a Local Area Network (LAN).

The computer program 804 may furthermore be provided as a pure computer program or comprised in a file or files. The file or files may be stored on the computer-readable medium and e.g. available through download e.g. over the computer network 805, such as from the mass storage device 803 via a server. The server may e.g. be a web or file transfer protocol (ftp) server. The file or files may e.g. be executable files for direct or indirect download to and execution on the core network node 107, e.g. by the processing circuit 604, or on the first network node 109, e.g. by the processing circuit 704, or may be for intermediate download and compilation to make them executable before further download and execution causing the nodes to perform the respective method as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analog and digital circuits, and/or one or more processors configured with software and/or firmware, e.g. stored in memory, that, when executed by the one or more processors make the core network node 107 and/or the first network node 109 to be configured to and/or to perform the above-described methods, respectively.

The term "network node" as used herein may as such refer to any type of radio network node (described below) or any network node, which may communicate with at least a radio network node. Examples of such network nodes include any radio network node stated above, a core network node (e.g. MSC, MME, etc.), Operations & Maintenance (O&M), Operations Support Systems (OSS), Self Organizing Network (SON) node, positioning node (e.g. E-SMLC), MDT etc.

The term "radio network node" as used herein may as such refer to any type of network node serving a wireless device, e.g. UE, and/or that are connected to other network node(s) or network element(s) or any radio node from which a wireless device, e.g. UE, receives signals. Examples of radio network nodes are Node B, base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Each of the terms "wireless device", "user equipment" and "UE", as used herein, may refer to any type of wireless device arranged to communicate with a radio network node in a cellular or mobile communication system and may thus be referred to as a wireless communication device. Examples include: target devices, device to device UE, machine type UE or UE capable of machine to machine communication, PDA, iPAD, Tablet, mobile terminals, smart phone, laptop embedded equipped (LEE), laptop mounted equipment (LME), USB dongles etc. While said terms are used frequently herein for convenience, or in the context of examples involving other 3GPP nomenclature, it must be appreciated that the term as such is non-limiting and the teachings herein apply to essentially any type of wireless device.

The term "node" as used herein may be used for the sake of simplicity, in order to denote a node which may be a network node, a radio network node or a wireless device or UE, as applicable.

Note that although terminology used herein may be particularly associated with and/or exemplified by certain cellular communication systems, wireless communication networks etc., depending on terminology used, such as wireless communication networks based on 3GPP, this should not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that terminology such as first network node, second network node, first wireless device, second wireless device, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a core network node, for managing wireless device associated information, the core network node being comprised in a core network of a wireless communication network, said wireless communication network further comprising a Radio Access Network, "RAN", and an Operation and Management, "OAM", system, wherein the method comprises:

obtaining said wireless device associated information, wherein the wireless device associated information comprises identities of group of wireless devices affected by congestion;

encrypting the wireless device associated information into an encrypted representation, wherein one or more decryption keys for decryption of the encrypted representation is accessible by a first network node comprised in the wireless communication network, and wherein the encrypted representation is accomplished using an encryption seed that is changed compared to another encryption seed previously used for encrypting, whereby the encrypted representation is changed compared to a previous encrypted representation, and sending, to the OAM system via the RAN, identifier assistance data (IAD) comprising the encrypted representation, wherein the OAM system shares the IAD to the first network node for decryption, and wherein the identifier assistance data appears as a random bit pattern when received by the RAN and the OAM system.

2. The method as claimed in claim 1, wherein the wireless device associated information and/or said identifier assistance data comprise one or more access point identifiers identifying access points comprised in the wireless communication network.

3. The method as claimed in claim 1, wherein access to said one or more decryption keys is restricted, with said one or more decryption keys stored in and/or being arranged for specific access by the first network node.

4. The method as claimed in claim 1, wherein the encryption seed is changed in response to one or more of the following events:

at each different encryption occasion, when a wireless device associated with wireless device associated information has a context established in the RAN at an idle state to connected state transition, when a wireless device associated with the wireless device associated information is subject to a handover, and when a timeout period has expired.

5. A core network node for managing wireless device associated information, the core network node being configured to be comprised in a core network of a wireless communication network, said wireless communication network comprising a Radio Access Network, "RAN", and an Operation and Management, "OAM", system, wherein the core network node comprising a processor; and a memory, the memory containing instructions executable by the processor, whereby the core network node is configured to:

obtain said wireless device associated information, wherein the wireless device associated information comprises identities of group of wireless devices affected by congestion;

encrypt the wireless device associated information into an encrypted representation, wherein one or more decryption keys for decryption of the encrypted representation is accessible by, a first network node comprised in the wireless communication network, and wherein the encrypted representation is accomplished using an encryption seed that is changed compared to another encryption seed previously used for encrypting, whereby the encrypted representation is changed compared to a previous encrypted representation, and send, to the OAM system via the RAN, identifier assistance data (IAD) comprising the encrypted representation, wherein the OAM system shares the IAD to the first network node for decryption, and wherein the identifier assistance data appears as a random bit pattern when received by the RAN and the OAM system.

6. The core network node as claimed in claim 5, wherein the wireless device associated information and/or said identifier assistance data comprise one or more access point identifiers identifying access points comprised in the wireless communication network.

7. The core network node as claimed in claim 5, wherein access to said one or more decryption keys is restricted, with said one or more decryption keys stored in and/or being arranged for specific access by the first network node.

8. The core network node as claimed in claim 5, wherein the encryption seed is changed in response to one or more of the following events:

at each different encryption occasion, when a wireless device associated with wireless device associated information has a context established in the RAN at an idle state to connected state transition, when a wireless device associated with the wireless device associated information is subject to a handover, and when a timeout period has expired.

* * * * *